Patented July 18, 1950

2,515,461

UNITED STATES PATENT OFFICE 2,515,461

PROCESS FOR PRODUCING STREPTOMYCIN ON MEDIUM CONTAINING WHOLE YEAST

Lloyd E. McDaniel, Rahway, N. J., assignor to Merck & Co., Inc., Rahway, N. J., a corporation of New Jersey No Drawing. Application November 16, 1946, Serial No. 710,401

5 Claims. (Cl. 195—80)

This invention relates to the production of chemical compounds by microbiological processes, and particularly to an improved process for producing streptomycin by the cultivation of streptomycin-producing actinomycetes in novel culture media.

Actinomycetes which produce streptomycin are of the aerial mycelium producing and sporulating group which has been given the name Streptomyces, and the most satisfactory organisms for producing streptomycin are strains of *Streptomyces griseus*.

In a publication by Schatz, Bugie, and Waksman in Proceedings of the Society for Experimental Biology and Medicine, 55, 66–69 (1944), which first disclosed the production of streptomycin, the use of either meat extract or corn steep liquor as a component of the culture medium is indicated as being essential to the production of this antibiotic substance. While streptomycin can readily be produced in media containing either meat extract or corn steep liquor, it has been found that the use of such media leaves much to be desired from the standpoint of yields of streptomycin obtained as well as the cost of these components for the media.

It is now discovered, in accordance with the present invention, that by the use of culture media containing neither meat extract nor corn steep liquor, but instead containing whole yeast, together with a carbohydrate, or other source of carbon, and inorganic nutrient salts, it is possible to obtain yields of streptomycin of the order of 50% greater than yields obtainable using meat extract media. Since meat extract is superior to corn steep liquor, it is evident that the increased yields of streptomycin in the new yeast medium, as compared with media containing corn steep liquor, is even more pronounced.

Yeast extract has also been tried as a component in culture media in place of meat extract, but it is found that yeast extract media do not compare favorably in streptomycin yield with media containing whole yeast. This is apparently due to the fact that there are present in the whole yeast nutrient factors which are not present in the yeast extract and which aid or stimulate the production of streptomycin by the organism.

There are essentially two types of whole yeast which can be used in the new medium. One of these is dried brewer's yeast which is recovered as a by-product in the alcohol-brewing industry. The other type is primary yeast, or yeast which has been grown for the yeast itself. Both types of yeast have been found about equally practical with slight variations between different brands, or yeast obtained from different sources. Both types of yeast are considerably less costly than meat extract or yeast extract, and this cost differential is most pronounced in the case of by-product, or brewer's yeast.

It is found that the most satisfactory medium for production of streptomycin by the organism *Streptomyces griseus* has approximately the following composition:

| | Per cent |
|---|---|
| Dry yeast | 2.5 |
| Dextrose | 1.0 |
| NaCl | 1.0 |
| $NaNO_3$ | 0.5 |
| $K_2HPO_4$ | 0.1 |
| $MgSO_4.7H_2O$ | 0.1 |
| $CaCl_2$ | 0.01 |
| $FeSO_4.7H_2O$ | 0.001 |
| $ZnSO_4.7H_2O$ | 0.0002 |
| Tap water to | 100 |

In preparing streptomycin by the improved process of the present invention, a medium of the above composition is placed in a suitable deep vessel having means for agitation and aeration of the medium, sterilized by heating at 120° C. for one-half hour, and cooled to about 25° C. The sterilized medium is then inoculated with a culture of *Streptomyces griseus* and incubated at about 28° C. under aerobic submerged conditions, i. e., constant agitation and aeration. The maximum streptomycin production under these conditions is usually reached in about three to four days. At this time the growth is removed by filtration, and the filtrated culture broth is treated with activated charcoal to adsorb the streptomycin from the broth. The charcoal is then eluted with a low normality aqueous alcoholic acid solution, thereby forming an aqueous solution containing streptomycin from which streptomycin can readily be recovered by known methods. By this procedure yields of streptomycin, in terms of units present per milliliter of culture filtrate average about 250 units per milliliter. It will, of course, be apparent that the yields in different batches may vary considerably due to differences in the streptomycin-producing properties of inocula and inherent differences in dry yeast which is available from time to time.

The following examples indicate how the process of the present invention can be carried out as well as demonstrating the effects of certain variations in the medium and the superiority of the whole yeast medium over media containing meat extract or yeast extract, but it will be understood that these examples are given by way of illustration and not of limitation.

Example I

A medium is prepared having the following composition:

| | Percent |
|---|---|
| Dry brewer's yeast (Pfeiffers) | 2.5 |
| Dextrose | 1.0 |
| NaCl | 1.0 |
| NaNO$_3$ | 0.5 |
| K$_2$HPO$_4$ | 0.1 |
| MgSO$_4$.7H$_2$O | 0.1 |
| CaCl$_2$ | 0.01 |
| FeSO$_4$.7H$_2$O | 0.001 |
| ZnSO$_4$.7H$_2$O | 0.0002 |
| Tap water to | 100 |

This medium is distributed in appropriate deep vessels having suitable means of agitation and aeration of the medium. The medium is sterilized by heating at 120° C. for one-half hour. It is then cooled to 25° C., inoculated with a culture of *Streptomyces griseus*, and incubated at 28° C.

The activity after growth at 28° C. for three days, with constant agitation and aeration, is approximately 250 u./ml. This growth is removed by filtration and the active portion is adsorbed on charcoal. The charcoal is eluted with an alcohol acid mixture, about 0.2 N in 50% aqueous-methanol, to isolate an aqueous solution containing streptomycin.

Example II

A comparison of the final activities of various batches prepared with yeast as against those prepared using the meat extract medium is shown below. The yeast medium employed is of the composition shown in Example I. The meat extract medium is of the composition disclosed by Schatz, Bugie, and Waksman in Proceedings of the Society for Experimental Biology and Medicine, 55, 66–69 (1944). All of the media are sterilized, inoculated, and incubated for three days at 28° C., as described in Example I.

| Experiment No. | Yeast Medium | Meat Extract |
|---|---|---|
| | u./ml. | u./ml. |
| 1 | 168 | 150 |
| 2 | 240 | 160 |
| 3 | 223 | 150 |
| 4 | 268 | 154 |
| 5 | 220 | 146 |
| 6 | 246 | 150 |
| Average | 228 | 152 |

Thus, the average of six experiments shows that approximately 50% more streptomycin is produced in the yeast medium than in the meat extract medium.

Example III

Media were prepared as shown in Example I, using dry yeast and yeast extract to determine the relative merits of each. The following results indicate the superiority of dry yeast. (Time of tests was four days.)

| | Per cent | u./ml. |
|---|---|---|
| Dry Brewer's Yeast (Pfeiffers) | 2.5 | 217 230 193 |
| Yeast Extract (Bacto) | 0.5 1.5 2.5 | 80 101 123 |

A similar comparative test, using dry brewer's yeast and a different yeast extract gave the following results after four days' incubation.

| | Per cent | u./ml. |
|---|---|---|
| Dry Brewer's Yeast (Pfeiffers) | 2.5 | 286 |
| Yeast Extract (Anheuser Busch #3) | 2.0 3.0 4.0 5.0 | 143 139 84 47 |

Modifications may be made in carrying out the present invention without departing from the spirit and scope thereof, and I am to be limited only by the appended claims.

I claim:

1. The process for the production of streptomycin that comprises propagating a streptomycin producing strain of *Streptomyces griseus* under aerobic submerged conditions in a sterile aqueous medium having nutrient components consisting of about 2.5% whole yeast, a source of carbon, and inorganic salts.

2. The process for the production of streptomycin that comprises propagating a streptomycin producing strain of *Streptomyces griseus* under aerobic submerged conditions in a sterile aqueous medium having nutrient components consisting of about 2.5% whole yeast, carbohydrate, and inorganic salts.

3. The process for the production of streptomycin that comprises propagating a streptomycin producing strain of *Streptomyces griseus* under aerobic submerged conditions in a sterile aqueous medium having nutrient components consisting of about 2.5% dry whole yeast, a source of carbon, and inorganic salts.

4. The process for the production of streptomycin that comprises propagating a streptomycin producing strain of *Streptomyces griseus* under aerobic submerged conditions in a sterile aqueous medium having nutrient components consisting of about 2.5% dry whole yeast, 1% dextrose, and inorganic salts.

5. The process for the production of streptomycin that comprises propagating a streptomycin producing strain of *Streptomyces griseus* under aerobic submerged conditions in a sterile aqueous nutrient medium having the following composition:

| | Per cent |
|---|---|
| Dry whole yeast | 2.5 |
| Dextrose | 1.0 |
| NaCl | 1.0 |
| NaNO$_3$ | 0.5 |
| K$_2$HPO$_4$ | 0.1 |
| MgSO$_4$.7H$_2$O | 0.1 |
| CaCl$_2$ | 0.01 |
| FeSO$_4$.7H$_2$O | 0.001 |
| ZnSO$_4$.7H$_2$O | 0.0002 |
| Tap water to | 100 |

LLOYD E. McDANIEL.

REFERENCES CITED

The following references are of record in the file of this patent:

UNITED STATES PATENTS

| Number | Name | Date |
|---|---|---|
| 1,534,387 | Hildebrandt | Apr. 21, 1925 |
| 2,449,866 | Waksman et al. | Sept. 21, 1948 |

OTHER REFERENCES

Le Page et al., Jr. Biol. Chem. 162; 1, Jan. 1946, pp. 163.

Smith: Industrial Mycology, 2 ed., Edw. Arnold & Co., Ltd., London, 1943, pp. 171–173.

Levine: A Compilation of Culture Media (1930), Williams & Wilkins, pp. 195, 304, 675.